D. G. ROOS.
POWER TRANSMITTING MECHANISM.
APPLICATION FILED MAY 5, 1919.

1,345,462.

Patented July 6, 1920.
4 SHEETS—SHEET 1.

Inventor:
Delmar G. Roos,
by Emery, Booth, Janney & Varney
Attys.

Inventor:
Delmar G. Roos,

D. G. ROOS.
POWER TRANSMITTING MECHANISM.
APPLICATION FILED MAY 5, 1919.
1,345,462.
Patented July 6, 1920.
4 SHEETS—SHEET 4.
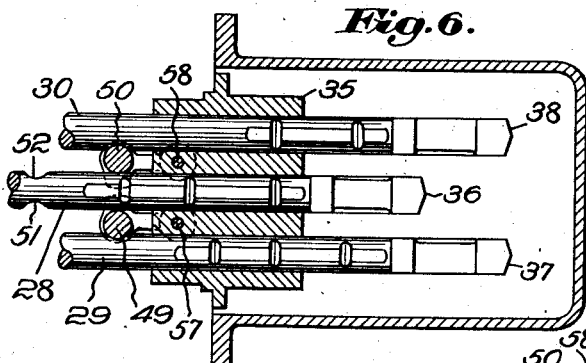
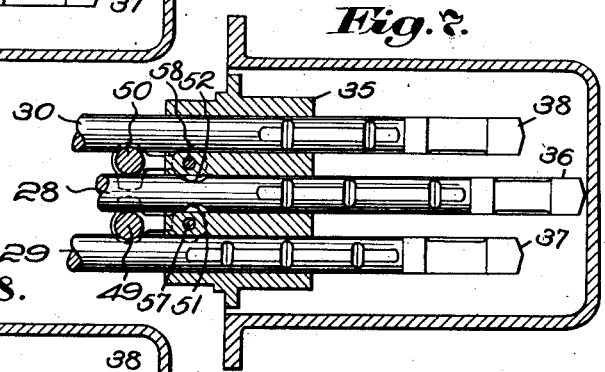
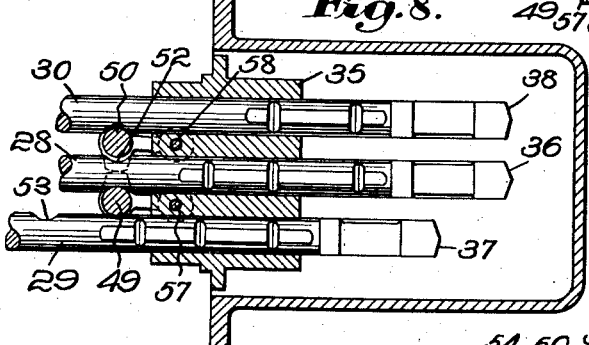
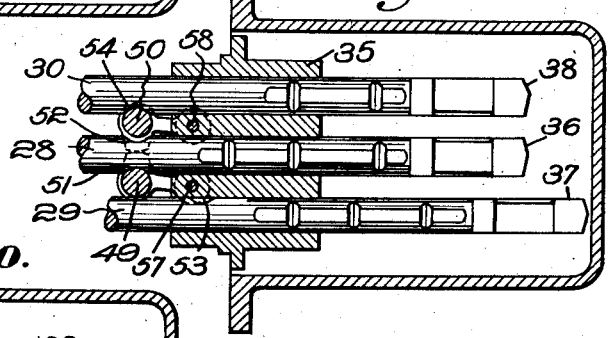
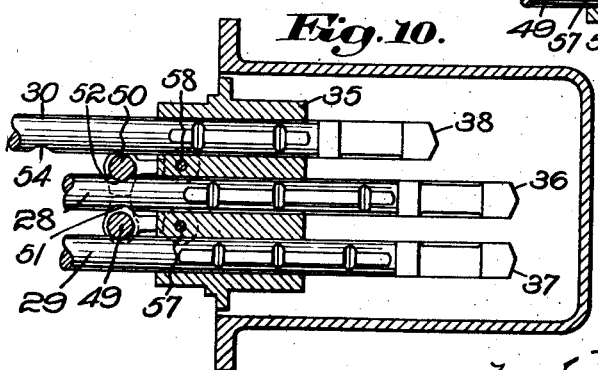
Inventor:
Delmar G. Roos.
by Emery, Booth, Janney & Varney, Attys.

UNITED STATES PATENT OFFICE.

DELMAR G. ROOS, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

POWER-TRANSMITTING MECHANISM.

1,345,462.

Specification of Letters Patent.   Patented July 6, 1920.

Application filed May 5, 1919.  Serial No. 294,719.

*To all whom it may concern:*

Be it known that I, DELMAR G. ROOS, a citizen of the United States, and a resident of Bridgeport, county of Fairfield, and State of Connecticut, have invented an Improvement in Power-Transmitting Mechanisms, of which the following description, in connection with the accompanying drawings, is a specification, like characters on the drawings representing like parts.

This invention relates to power transmitting mechanisms, and is more especially concerned with a selective type transmission gear set of the class commonly employed in motor vehicles to secure different gear ratios between the internal combustion engine and the driving wheels of the vehicle, although the invention is by no means limited to this class of work, but is capable of very general application.

My invention will be best understood by reference to the following description, when taken in connection with the accompanying drawings of one specific embodiment thereof selected for exemplification, while its scope will be more particularly pointed out in the appended claims.

Figure 1:
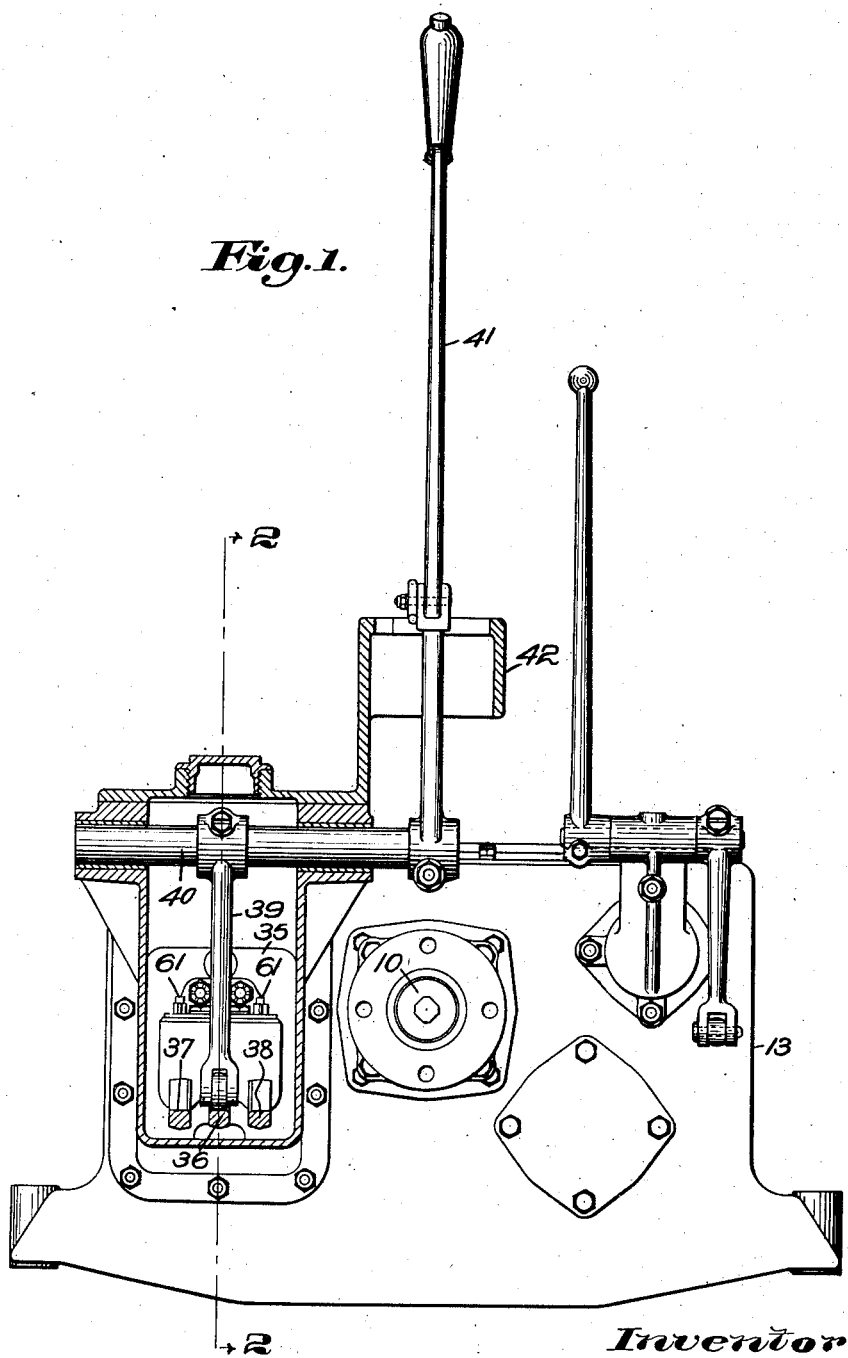
Figure 1 is a front elevation, partly in vertical cross-section, of a power transmitting mechanism exemplifying my invention.

Figs. 6 to 10, inclusive, are detail plan sections on an enlarged scale, illustrating the action of the interlocking device in various positions of the gear-shifting bars.

Referring to the drawings, and to the embodiment of my invention which is illustrated therein, I have selected for exemplification what is known as a four forward speed and reverse transmission gear set, comprising a driving shaft 10 (see Fig. 3), a driven shaft 11, and a countershaft 12, mounted in a usual manner in a gear case 13. Formed on, or secured to, the driving shaft 10 is a driving pinion 14, which constantly meshes with and drives a gear 15, the latter being secured to the countershaft 12. The first speed is secured by a pinion 16 formed on or secured to the countershaft 12, and adapted to mesh with a sliding gear 17 splined on the driven shaft 11. The second speed is obtained by the use of a gear 18, formed on or secured to the countershaft 12, and adapted to mesh with a sliding gear 19 splined on the driven shaft 11. The third speed is obtained by the use of a gear 20, formed on or secured to the countershaft 12, and meshing with a sliding gear 21 splined on the driven shaft 11. The fourth speed is secured by providing a clutch in the form of an internal gear 22, formed within the gear 21, and adapted to mesh with the driving pinion 14. Under these circumstances, the driving and driven shafts are directly coupled together, and what is known as "direct drive" is obtained. Reverse is obtained by the use of a gear 23, formed on or secured to the countershaft 12, and adapted to mesh with an intermediate gear 24 (best shown in Fig. 2), the latter in turn being adapted to mesh with the gear 17.

Figure 5:
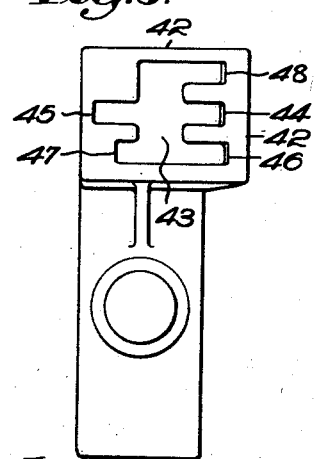
Fig. 5 is a detail plan section on line 5—5 of Fig. 2.

As a means for shifting the gears to secure the four forward speeds and reverse, there are provided three gear-shifting forks 25, 26 and 27, carried respectively by gear-shifting bars 28, 29 and 30. The gears 17 and 19 constitute a unit provided with an annular groove 31, which receives the fork 25. The hub of the gear 21 is provided with a similar annular groove 32 to receive the fork 26, while the hub of the gear 24 is provided with an annular groove 33, to receive the fork 27. The bars 28, 29 and 30 are mounted to slide lengthwise in suitable guides 34 and 35, secured to the gear case 13, and said bars are provided respectively with jaws 36, 37 and 38, each of which is adapted to receive the free end of a depending arm 39 (see Fig. 2), the latter being secured to an axially movable shaft 40. To the latter is secured a gear shifting lever 41, operating in a gate 42. This gate is provided with an irregularly shaped opening (see Fig. 5), comprising a main transverse slot 43, corresponding to the neutral position of the lever 41, and provided with longitudinal branch slots 44, 45, 46, 47 and 48, corresponding, respectively, to the positions occupied by the gear-shifting lever in obtaining first, second, third, fourth and reverse gear positions. It should here be noted that the branch slot 48 is distinct from the other branch slots, and that reverse is obtained through the use of the third gear-shifting bar distinct from those by means of which the forward speeds are obtained. This is to obviate the possibility of accidental engagement with the intermediate reverse gear, which sometimes occurs when only two bars and two sets of branch slots are employed. By providing the slot 48 for the reverse position of the lever, the danger of accidentally engaging the reverse gear is avoided.

Figure 2:
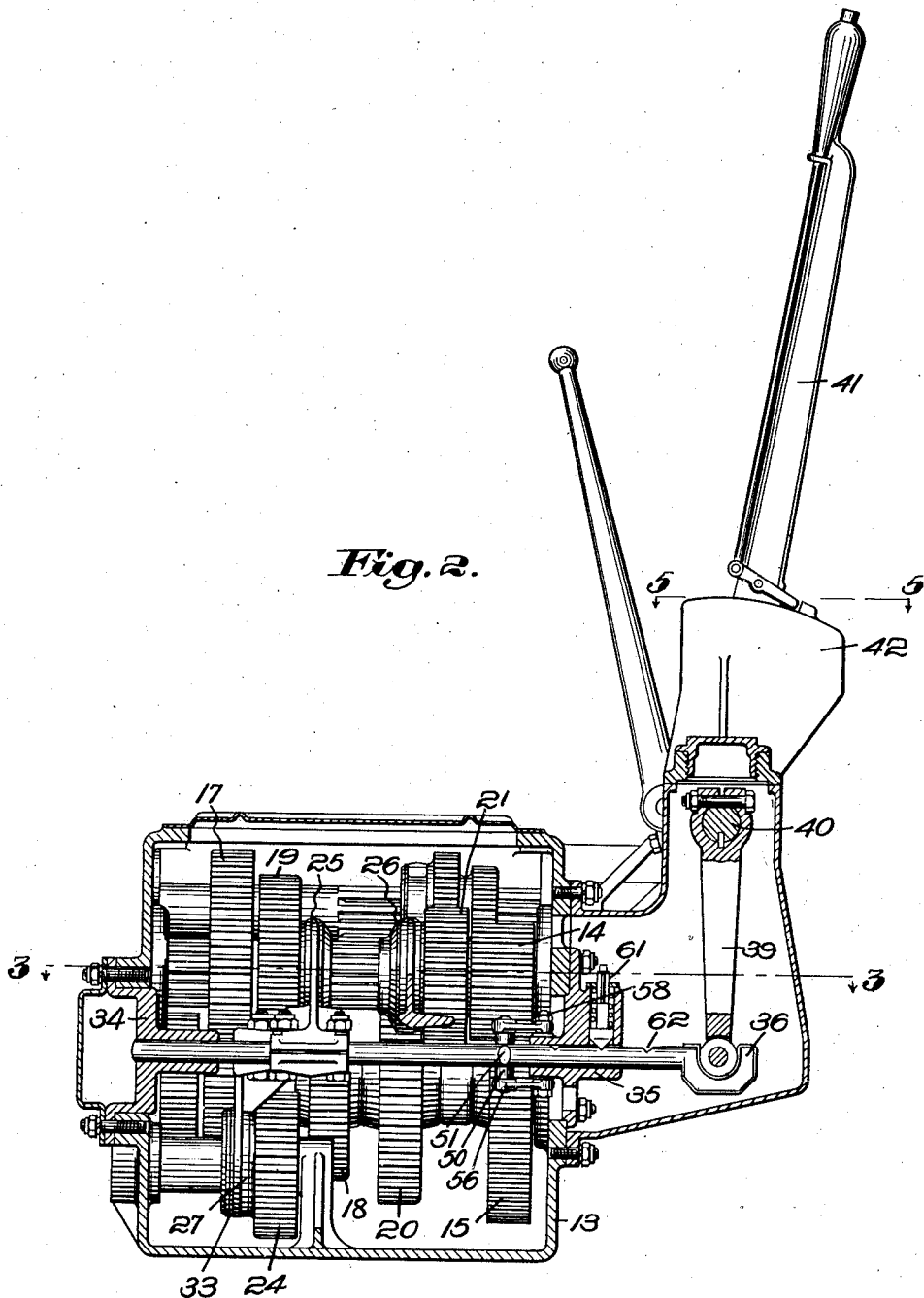
Fig. 2 is a vertical sectional view on line 2—2 of Fig. 1.
Figure 3:
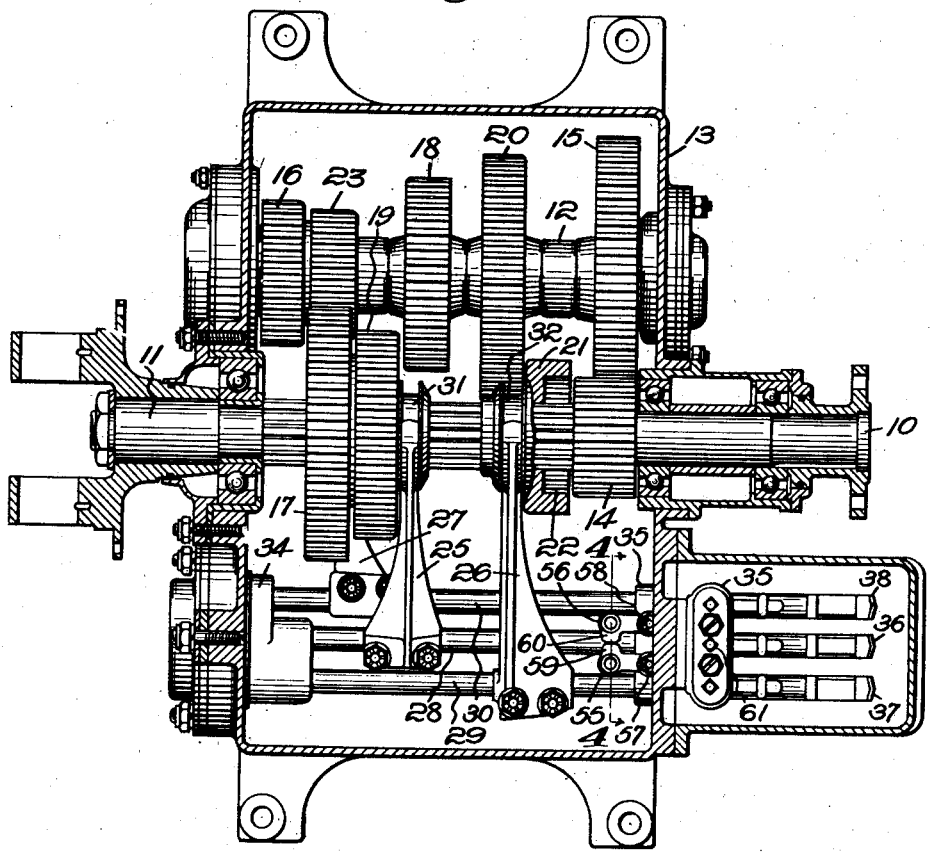
Fig. 3 is a plan section on line 3—3 of Fig. 2.

It has been stated that the transmission is of the selective type. This means that any one of the gear ratios may be availed of without passing through another, or in other words, any ratio may be selected at will independently of the others. A common and well-known way of accomplishing this is by the use of a plurality of gear-shifting bars, provided respectively with jaws any one of which may be engaged and moved by the gear-shifting lever, as is the case in the described construction. This necessarily involves the idea of a neutral position, to which each gear-shifting bar should be brought, and in which it should remain while one of the bars is longitudinally displaced. This neutral position is represented in Figs. 2 and 3, in which each of the bars is in neutral position, as is also the gear-shifting lever.

It is customary to place a transmission of this class with the axes of the gears extending lengthwise of the motor vehicle. Now it must be evident that when so placed, the gears are likely to be accidentally shifted by the forward or rearward movement of the vehicle, owing to the inertia of the gears. This sometimes happens when the vehicle suddenly starts or stops. When this occurs, there is serious danger of the teeth of the gears being stripped. As a means to prevent such accidental shifting of the gears, I have provided the interlocking means which I shall now describe.

Figure 4:
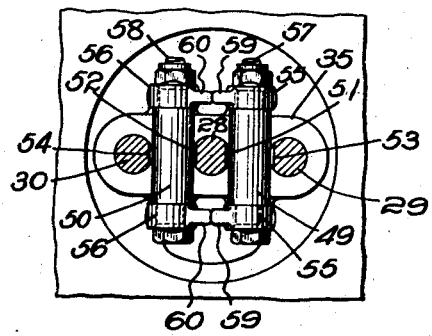
Fig. 4 is a detail sectional view on an enlarged scale on line 4—4 of Fig. 3.

In the present example, I have shown two members 49 and 50, interposed respectively between the intermediate bar 28 and the outer bars 29 and 30. The intermediate bar is provided with two oppositely located lateral depressions 51 and 52, adapted to receive the members 49 and 50, respectively, and the outer bars 29 and 30 are provided respectively with similar depressions 53 and 54, also adapted to receive said members, as best shown in Fig. 4. The members 49 and 50 are suitably constructed and arranged, so that on the one hand when the intermediate bar 28 is moved lengthwise, said members are moved laterally in opposite directions into the depressions 53 and 54, respectively; and when, on the other hand, either of the outer rods 29 and 30 is moved lengthwise, such rod moves the adjacent member laterally into the adjacent depression in the intermediate rod, and in addition acts through such member to move the remaining rod laterally into the depression of the other outer rod.

To this end, the locking members 49 and 50 herein are formed as separate pieces carried by suitable swinging means normally engaging each other laterally. One convenient way of accomplishing this is by making the ends of the members 49 and 50 reduced, and suitably secured as by riveting, in upper and lower pairs of arms 55 and 56, pivoted on bolts 57 and 58 on the guide 35, as shown in Figs. 3 and 4. Thus the members 49 and 50 are swingingly mounted in such manner as to secure smooth mechanical action, and without being mere floating members. Lateral engagement between the two swinging parts may be effected conveniently by providing the arms 55 and 56 with lateral projections 59 and 60, normally engaging each other laterally, as clearly shown in Figs. 3 and 4. Preferably, the members 49 and 50 are rounded laterally, and in the present example, they are cylindrical and the depressions in the bars 28, 29 and 30 are similarly rounded, thereby constituting cam surfaces. Preferably, also, the diameters of the members 49 and 50 are greater than the spaces between the unrecessed portions of the bars. The diameter of each of the members 49 and 50 is herein approximately equal to the distance between two adjacent bars, plus the depth of one of the depressions.

It should now be apparent that lengthwise movement of the intermediate bar 28 will be accompanied by lateral movement of the locking members 49 and 50 in opposite directions into the depressions of the outer bars, as illustrated in Fig. 6. This is the position which the parts will assume when the gear-shifting lever is moved from its neutral position into the slot 44, to obtain the first speed. When this occurs, the outer bars 29 and 30 are positively locked against endwise displacement, and hence the gears whose movements they control are locked against axial movement. So, also, when the intermediate bar is moved lengthwise in the opposite direction to the position illustrated in Fig. 7, the locking members 49 and 50 will be moved laterally into the depressions 53 and 54, thus locking the outer bars 29 and 30 against lengthwise movement. This is the position which the parts will assume when the gear-shifting lever is moved from its neutral position into the slot 45 to obtain the second speed. When this occurs, the outer bars 29 and 30 are positively locked against endwise displacement, and hence the gears whose movements they control are locked against axial movement.

Similarly, when the gear-shifting lever is moved into the slot 46 to obtain the third speed, the bar 29 will be moved lengthwise into the position shown in Fig. 8, whereupon the locking members 49 and 50 will be moved laterally in the same direction, one entering the depression 51 in the intermediate bar 28, and the other entering the depression 54 in the bar 30. It follows that when this occurs, the bars 28 and 30 will be positively locked against lengthwise movement, and hence the gears which they control will be locked against axial movement. Likewise, when the gear-shifting lever is moved into the slot 47 to obtain the fourth speed, the bar 29 will be moved lengthwise into the position shown in Fig. 9, whereupon the locking members 49 and 50 will be moved laterally, one entering the depression 51 in the intermediate bar 28, and the other entering the depression 54 in the bar 30. It follows that when this occurs, the bars 28 and 30 will again be positively locked against lengthwise displacement, and hence the gears which they control will be locked against axial movement.

When the gear-shifting lever is moved into the slot 48 to obtain reverse, the bar 30 will be moved lengthwise into the position shown in Fig. 10, whereupon the locking members 49 and 50 will be moved laterally one entering the depression 52 in the intermediate bar 28, and the other entering the depression 53 in the bar 29. It follows that when this occurs, the bars 28 and 29 will be positively locked against lengthwise movement, and hence the gears which they control will be locked against axial movement.

It should now be apparent that I have provided a thoroughly reliable and positive means for locking the gears against accidental shifting, while still preserving the advantages to be derived from the use of the isolated slot to receive the gear-shifting lever in its reverse position. It should also be evident that this is accomplished with a minimum of parts, and the utmost simplicity.

The gear-shifting bars may be, and are herein, provided with usual means yieldingly to position them in definite positions with relation to the positions of the gears which they control. One well-known way of accomplishing this is to provide for each rod a spring-pressed pin exemplified by a pin 61 in Fig. 2, coöperating with a series of depressions 62 in the rod, the location of these depressions corresponding to the different positions which the rod assumes. When the rod is moved lengthwise, the spring-pressed pin yields and allows the rod to be shifted, and when the rod reaches its next position, said pin enters the next depression and acts as a detent to hold the rod in such position. It should be understood, however, that these spring-pressed pins are insufficient to prevent accidental shifting of the gears under the circumstances hereinbefore described, and that the described interlocking means are essential to serve as a safeguard.

Having thus described one embodiment of my invention, but without limiting myself thereto, what I claim and desire by Letters Patent to secure is:

1. In a power-transmitting mechanism, the combination of a gear set comprising a plurality of gears affording four forward speeds and reverse, means for operating said gear set, including three sliding rods, and swinging means operated by any one of said rods upon lengthwise movement thereof to lock the remaining two rods against lengthwise movement.

2. In a four forward speed and reverse transmission of the selective type, the combination of a gear set comprising a plurality of gears affording four forward speeds and reverse, means for selectively shifting said gears to produce the gear ratio changes, said means including three sliding rods, and swinging interlocking means operated by any one of said rods upon lengthwise movement thereof to interlock with the remaining two rods to hold the same against lengthwise movement.

3. In a power-transmitting mechanism, the combination of a gear set comprising a plurality of gears affording four forward speeds and reverse, means for selectively operating said gear set, including three sliding rods, and means operated by any one of said rods upon lengthwise movement to lock the remaining two rods against lengthwise movement, the last mentioned means including two swinging members interposed between the intermediate rod and the two other rods.

4. In a power-transmitting mechanism, the combination of a gear set comprising a plurality of gears affording four forward speeds and reverse, means for selectively operating said gear set, including three sliding rods comprising two outer rods each provided with a depression and an intermediate rod provided with two depressions, and means operated by any one of said rods upon lengthwise movement thereof to enter depressions of the remaining two rods to hold the same against lengthwise movement, the last-mentioned means comprising two coöperating swinging members.

5. In a power-transmitting mechanism, the combination of a gear set comprising a plurality of gears affording four forward speeds and reverse, means for selectively operating said gear set, including three sliding rods comprising two outer rods each provided with a depression and an intermediate rod provided with two depressions, and means operated by any one of said rods upon lengthwise movement thereof to enter depressions of the remaining two rods to hold the same against lengthwise movement, the last-mentioned means comprising two members interposed, respectively, between said intermediate rod and said outer rods, and swinging arms carrying said members, respectively, each of said members, when moved inward by the adjacent outer rod, entering a depression in said intermediate rod and carrying means to move the other member into the depression of the other outer rod, and said members, when moved in opposite directions by said intermediate rod, entering the depressions in said other rods, respectively.

6. In a power-transmitting mechanism, the combination of a gear set comprising a plurality of gears affording four forward speeds and reverse, means for selectively operating said gear set, including three sliding rods comprising two outer rods each provided with a depression and an intermediate rod provided with two depressions, and means operated by any one of said rods upon lengthwise movement thereof to enter depressions of the remaining two rods to hold the same against lengthwise movement, the last-mentioned means comprising two members interposed, respectively, between said intermediate and outer rods, and two pairs of swinging arms carrying said members and normally engaging each other, each of said members, when moved by one of said outer rods, causing its pair of arms to act through the other pair of arms to move the other member laterally in the same direction, and said members, when moved laterally in opposite directions by said intermediate rod, causing one pair of arms to separate from the other.

In testimony whereof I have signed my name to this specification.

DELMAR G. ROOS.